US006546321B1

(12) United States Patent
Ohkubo

(10) Patent No.: US 6,546,321 B1
(45) Date of Patent: Apr. 8, 2003

(54) METHOD AND APPARATUS FOR REWRITING DATA OF CONTROL UNIT FOR VEHICLE

(75) Inventor: Tatsuji Ohkubo, Atsugi (JP)

(73) Assignee: Unisia Jecs Corporation, Kanagawa-Ken (JP)

( * ) Notice: Subject to any disclaimer, the term of this patent is extended or adjusted under 35 U.S.C. 154(b) by 0 days.

(21) Appl. No.: 09/641,680

(22) Filed: Aug. 18, 2000

(30) Foreign Application Priority Data

Aug. 25, 1999 (JP) .......................................... 11-238230

(51) Int. Cl.[7] ......................... F02D 41/14; G06F 19/00; H04Q 1/00

(52) U.S. Cl. ........................... 701/35; 701/34; 123/486; 714/10

(58) Field of Search ................................ 701/1, 34, 35, 701/29; 123/486, 479, 690, 674, 339.1, 361; 714/10, 11, 23, 55, 752, 820, 46, 6, 13

(56) References Cited

U.S. PATENT DOCUMENTS 4,525,782 A * 6/1985 Wohlfarth et al. ..... 364/431.01
5,158,059 A * 10/1992 Kuroda ....................... 123/690
5,247,446 A * 9/1993 Motz et al. ............ 364/431.12
5,280,438 A * 1/1994 Kanemaru .................. 364/561
5,444,664 A * 8/1995 Kuroda et al. .............. 365/226
5,446,665 A * 8/1995 Adrian et al. .......... 364/431.04
5,490,064 A * 2/1996 Minowa et al. ........ 364/424.01
5,521,588 A * 5/1996 Kiihner et al. ......... 340/825.22
5,523,948 A * 6/1996 Adrain .................. 364/431.01
5,526,267 A * 6/1996 Sogawa ................. 364/431.11
5,586,034 A * 12/1996 Takaba et al. ......... 364/431.04
5,802,485 A * 9/1998 Koelle et al. ................. 701/29
5,815,071 A * 9/1998 Doyle ........................ 340/439
6,009,851 A * 1/2000 Iida et al. .............. 123/339.12
6,035,413 A * 3/2000 Kubota et al. ................. 714/6
6,108,598 A * 8/2000 Sumitani ..................... 701/29
6,116,227 A * 9/2000 Yoshioka et al. ........... 123/674
6,205,374 B1 * 3/2001 Kljima et al. .................. 701/1
6,330,510 B1 * 12/2001 Takaku et al. .............. 701/114

FOREIGN PATENT DOCUMENTS

JP 4-311642 11/1992
JP 10-247103 9/1998

* cited by examiner

*Primary Examiner*—Tan Q. Nguyen
*Assistant Examiner*—Dalena Tran
(74) *Attorney, Agent, or Firm*—McDermott, Will & Emery

(57) ABSTRACT

When a vehicle control unit is to be exchanged, out of learning data stored in a control memory of the control unit to be exchanged, the learning data correlating to vehicle parts to be exchanged at the same time are corrected to initial values, and the learning data after correction processing are written to a control memory of a new control unit.

12 Claims, 4 Drawing Sheets

METHOD AND APPARATUS FOR REWRITING DATA OF CONTROL UNIT FOR VEHICLE

BACKGROUND OF THE INVENTION (1) Field of the Invention

The present invention relates to a method and an apparatus for rewriting data of a control unit for a vehicle, and in particular relates to technology relating to rewriting learning data stored in a control memory of a control unit for a vehicle.

(2) Description of Related Art

Heretofore in a control unit for controlling an actuator of a vehicle engine an operation is carried out such that an engine can be controlled to desired conditions from the time it starts, by storing learning data in a control memory and then controlling the actuator on the basis of the learning data.

For example, in the idle rotation speed control disclosed in Japanese Unexamined Patent Publication No. Hei 4-311642, an actuator for regulating air quantity so that the engine rotation speed at the time of idling corresponds to a target rotation speed, is feedback controlled and a control signal for the actuator at the time when the target rotation speed is attained is stored in the control memory as learning data.

Also, there is the case where a memory that is electrically erasable and programmable using an external tool (for example an EEPROM) is used as the control memory for storing the learning data, the construction being such that the contents of the memory are rewritten without having to exchange the memory.

For example, with the rewritable device disclosed in Japanese Unexamined Patent Publication No. Hei 10-247103, when the learning data is not the initial value, saving of the learning results is achieved by outputting a signal required for prohibiting rewriting with an external tool.

However, in the case where there is a malfunction of the control unit, resulting in the exchange thereof at a maintenance facility, the malfunctioning control unit is taken out of the vehicle and a new control unit is installed in the vehicle. At this time, if the transfer of learning results from the control unit that has been taken out, to the newly installed control unit is not carried out, the need arises to redo the learning in order to correspond to deterioration over time, and differences of the parts. Hence, in the interval until the learning has progressed, there is the likelihood of a reduction in drivability.

Also, in the case where vehicle parts correlating to the learning data (for example, an actuator for regulating auxiliary air quantity in the idle rotation learning control) are exchanged, the learning data no longer conforms to a new actuator, so that it becomes necessary to reset the learning data to the initial value. Although the saving of the learning data progressed is carried out, the configuration is not one where only the learning data correlating to the exchanged vehicle parts is reset to the initial value. Hence the learning data conforming to the vehicle parts before the exchange continues to be used regardless of the vehicle parts that have been exchanged, and all the learning data is reset to the initial value including learning data that need not be reset to the initial value.

SUMMARY OF THE INVENTION

The present invention takes into consideration the aforementioned problems with the object of providing a method and an apparatus to appropriately rewrite learning data stored in the control memory of a control unit when vehicle parts exchange is carried out, and to perform appropriate transfer of learning data accompanying exchange of a control unit.

In order to achieve the above object, the present invention is constructed so that at the time of exchanging a vehicle control unit, of the learning data stored in the control memory of the old vehicle control unit, the learning data correlating to the vehicle parts that are exchanged at the same time as exchanging the control unit are corrected to the initial value, and the learning data after correction processing are transferred to the control memory of the new vehicle control unit.

Moreover, the construction is such that at the time of exchanging a vehicle control unit, in a condition with the new vehicle control unit communicably connected to the vehicle mounted old vehicle control unit, when a trigger signal is applied to the old vehicle control unit, the learning data are transferred to the new vehicle control unit.

Other objects and aspects of the present invention will become apparent from the following description of the embodiments given in conjunction with the appended drawings.

DESCRIPTION OF THE PREFERRED EMBODIMENT

Figure 1:
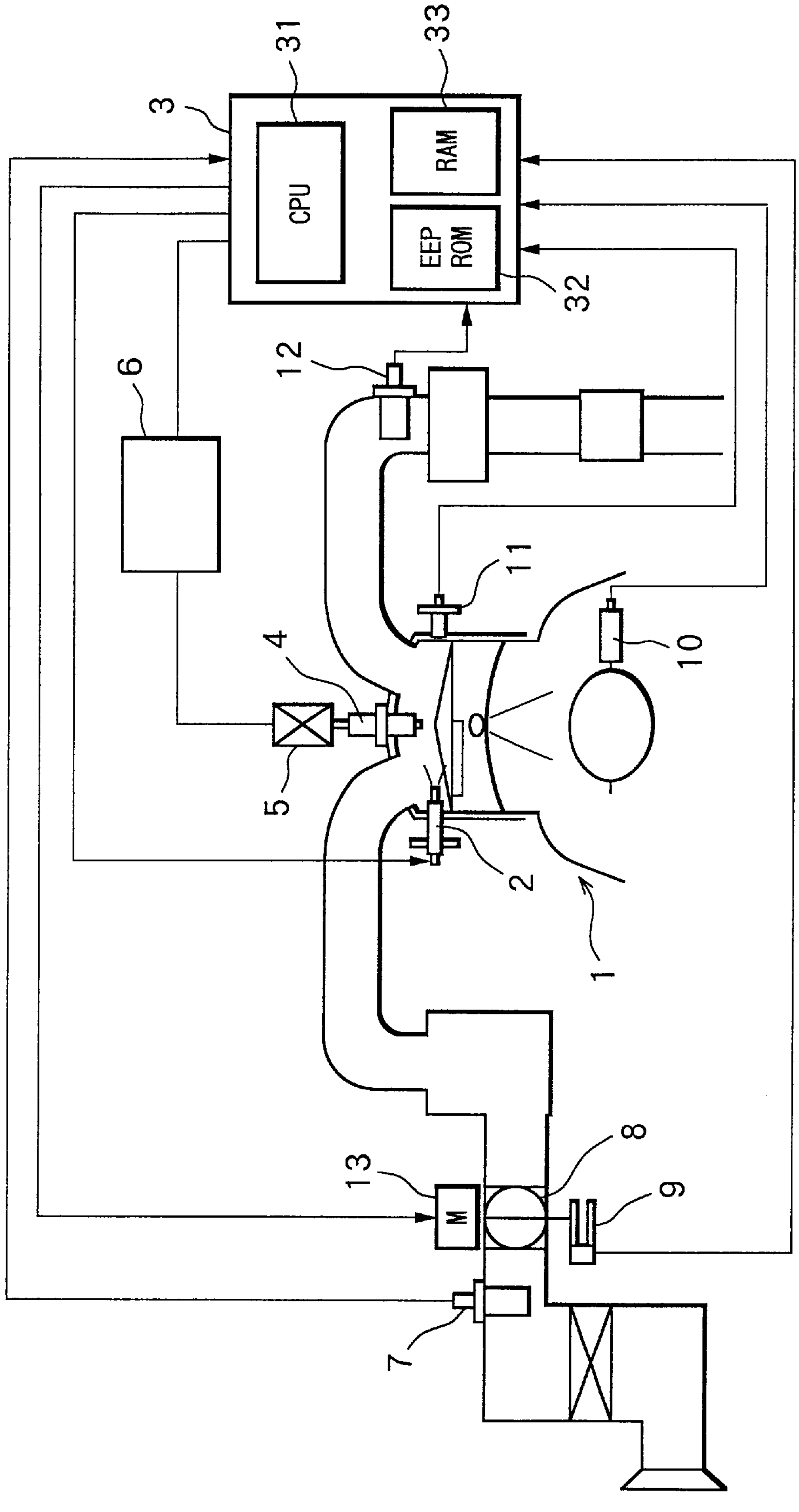
FIG. 1 is a diagram showing a system configuration of a vehicle engine of an embodiment.

FIG. 1 shows an engine and an engine control unit mounted on a vehicle (not shown in the figure).

An engine 1 shown in FIG. 1 is a direct injection gasoline engine provided with fuel injection valves 2 for injecting fuel directly into each of the cylinders, and provided with spark plugs 4 for each of the cylinders.

The fuel injection valves 2 are controlled separately for each of the cylinders in response to injection pulse signals from a control unit 3 with a built in microcomputer. Each spark plug 4 is provided with its own ignition coil 5. A power transistor unit 6 switches power on and off to the primary side of each of the ignition coils 5, to control the ignition timing for each of the cylinders in response to ignition signals from the control unit 3.

Detection signals from various types of sensors for controlling fuel injection and ignition timing and the like are input to the control unit 3.

For the various types of sensors there are typically provided, an airflow meter 7 for detecting intake airflow quantity, a throttle sensor 9 for detecting the opening of an electrical type throttle valve 8 driven on and off by a motor 13, a crank angle sensor 10 for detecting crank angle, a water temperature sensor 11 for detecting the temperature of the cooling water, and an oxygen sensor 12 for detecting the air-fuel ratio of the combustion mixture based on the oxygen concentration in the exhaust.

The control unit 3 is provided with a microcomputer including a CPU 31, an EEPROM 32, a RAM 33 and I/O devices (omitted from the figure). The electrically erasable and writable EEPROM 32 (control memory) updates and stores various kinds of learning data.

The learning data typically include; air-fuel ratio learning correction values for correcting the air-fuel ratio of the combustion mixture to a target air-fuel ratio, throttle valve 8 opening learning correction values for obtaining a target idle rotation speed at the time of idling, and various kinds of deterioration diagnostic information.

Figure 2:
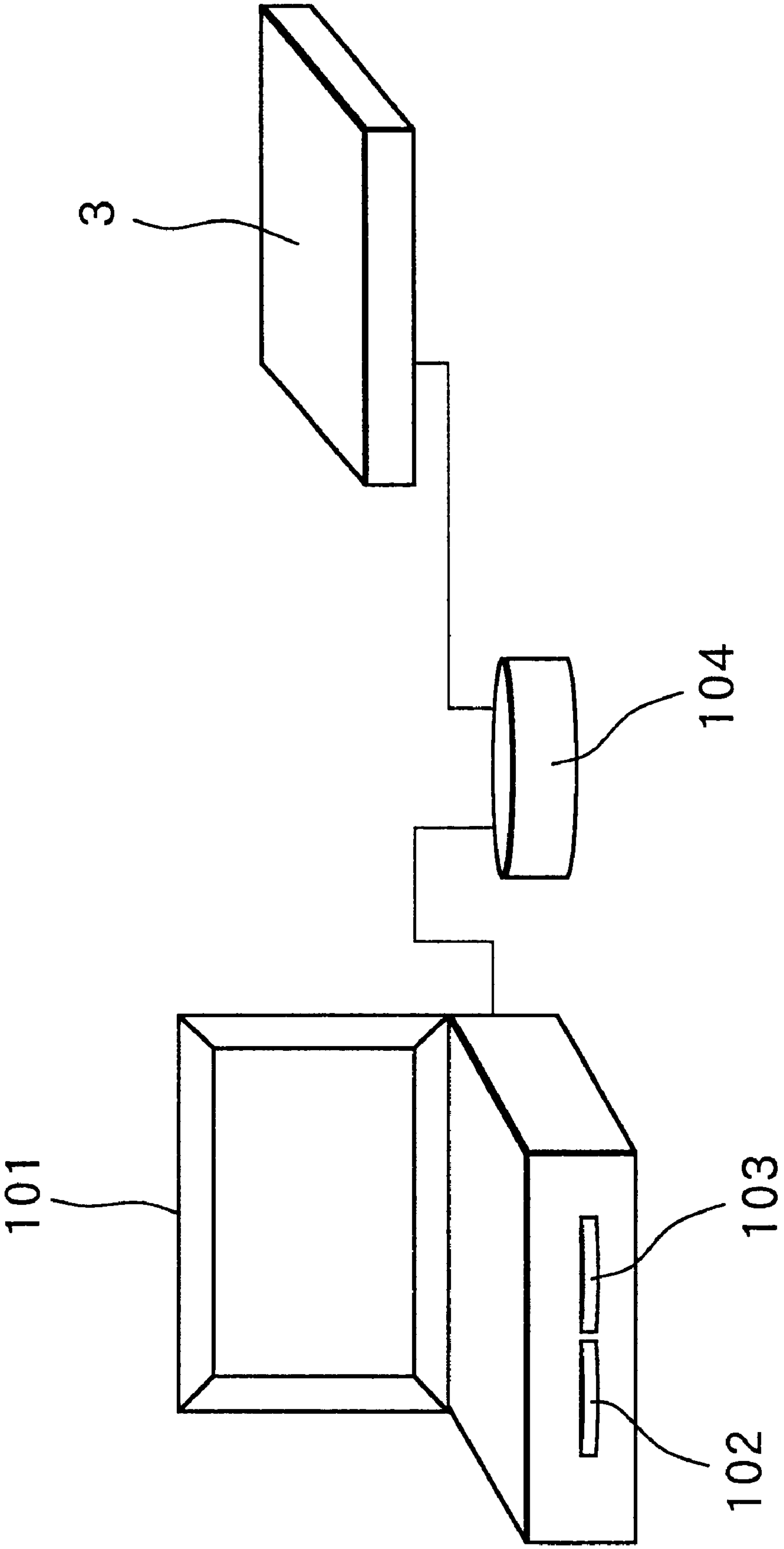
FIG. 2 is a system diagram showing a learning data rewriting system for a control unit of the embodiment.

Here, when vehicle parts such as the control unit 3 (vehicle control unit), and/or the air flow meter 7, the throttle valve 8, the oxygen sensor 12 and the like are exchanged, then as shown in FIG. 2, the control unit 3 is connected to a dedicated tester (or a personal computer) 101 functioning as a data rewriting device, which performs rewriting of the learning data stored in the EEPROM 32 of the control unit 3.

The dedicated tester 101 is provided with; a memory 102 (learning data storage means) for storing the various kinds of learning data read out from the EEPROM 32 of the control unit 3 (control memory), and a memory 103 (initial value storage means) in which initial values of the various kinds of learning data are pre-stored, and is connected to the control unit 3 via an interface device 104.

In the control unit 3 there is previously incorporated a communication function between itself and the dedicated tester 101. Also, for the memories 102 and 103, the construction may be such that other than a semiconductor memory, a recording medium such as a floppy disk can be used. Furthermore, in the case where a personal computer is used as the data rewriting device, software for learning data rewriting is pre-installed.

Figure 3:
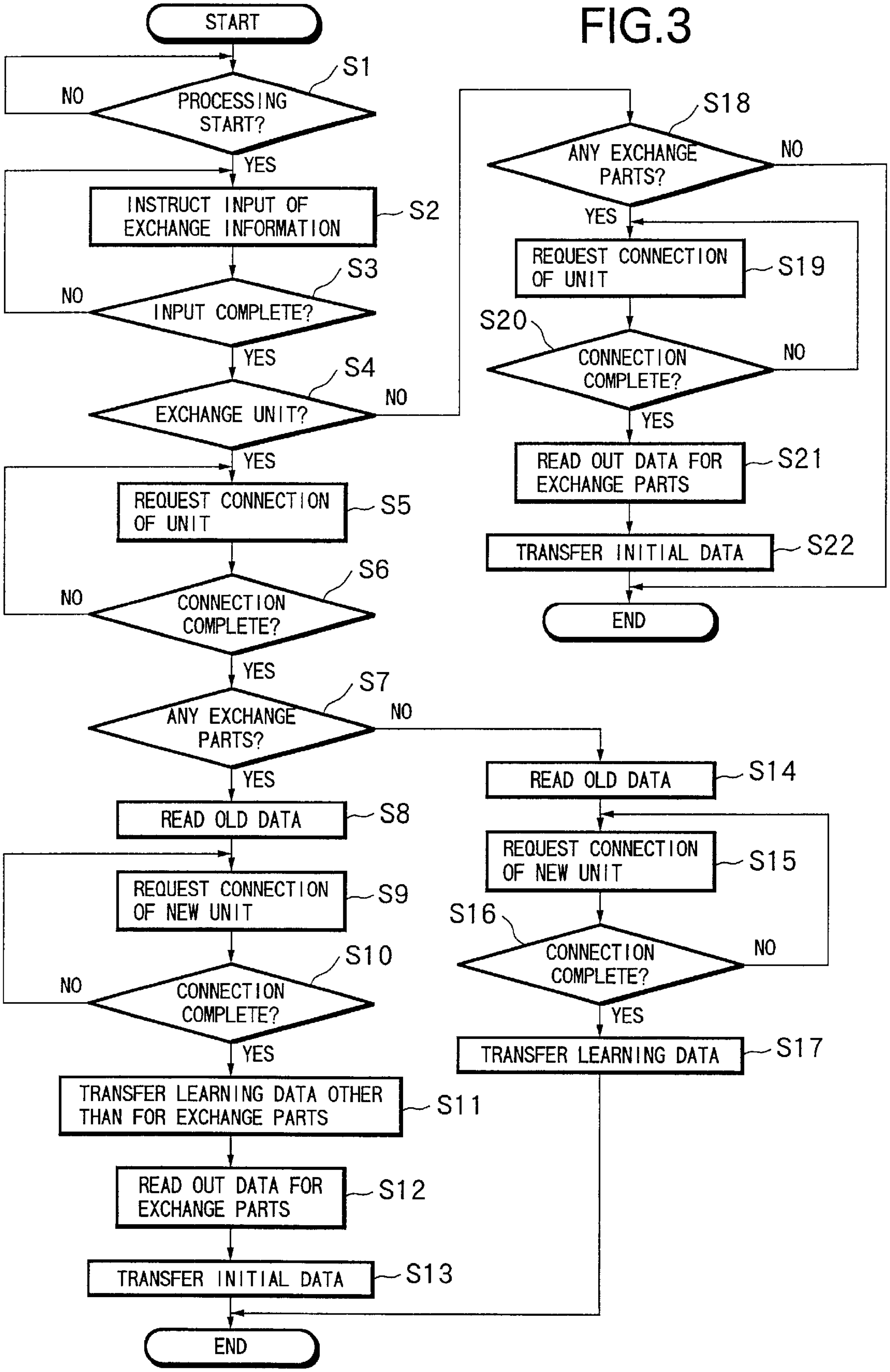
FIG. 3 is a flow chart showing a rewriting control for learning data for the control unit of the embodiment.

Aspects of the rewriting of the learning data by means of the dedicated tester 101 will be explained below following the flow chart in FIG. 3.

On start up of the learning data rewriting processing (step S1), in step S2 a prompt display relating to whether or not the control unit is to be exchanged and to other parts to be exchanged appears on the screen of the dedicated tester 101.

By operating input means such as a keyboard or a mouse, an operator inputs whether or not the control unit 3 is to be exchanged and inputs information about other exchange parts.

Then in step S3, when it is confirmed that the input of information has been completed, control proceeds to step S4.

In step S4 it is judged if the control unit 3 is to be exchanged. When it is to be exchanged, control proceeds to step S5 where connection of the old control unit 3 to be exchanged is prompted.

In step S6, it is judged if the control unit 3 has actually been connected, based on whether or not communication is possible. When it has actually been connected, control proceeds to step S7 where it is judged if there is to be an exchange of vehicle parts correlating to the learning data.

For example, in the case where parts of the electronic control fuel injection system such as the air flow meter 7, the oxygen sensor 12, and the fuel injection valves 2 are exchanged, it is judged that the parts correlating to the air-fuel ratio learning correction values are exchanged. In the case where parts of the air control system such as the throttle valve 8 and the motor 13 are exchanged, it is judged that the parts correlating to the idle rotation learning correction values are exchanged.

In the case where parts correlating to learning data are to be exchanged, control proceeds to step S8 where the various kinds of learning data read out from the EEPROM 32 of the old control unit 3 are stored into the memory 102.

Then, in step S9 a display prompting the connection of the new control unit 3 appears, and in step S10 it is confirmed if the new control unit 3 has actually been connected.

The construction may be such that when the old control unit 3 is removed, the new control unit 3 is connected using the same connector, or the construction may be such that separate connectors are provided, one for connecting the old control unit 3 and one for connecting the new control unit 3.

When the new control unit 3 has been connected, control proceeds to step S11 where learning data that has been stored in the old control unit 3, except for the learning data correlating to the parts to be exchanged, is written to a predetermined address in the EEPROM 32 of the new control unit 3.

Also in step S12, the initial values of the learning data correlating to the vehicle parts to be exchanged are read out from the memory 103. The function of this step S12 is equivalent to a rewriting data judgement means.

The correlations between the vehicle parts to be exchanged and the learning data are pre-stored in the dedicated tester 101 (memory 103).

In step S13, the initial values of the learning data that have been read out are written into the EEPROM 32 of the new control unit 3, thus completing the writing into the new control unit 3 of the necessary learning data. The functions of step S11 and step S13 are equivalent to a learning data writing means.

On the other hand, when judged in step S7 that there is to be no exchange of vehicle parts correlating to the learning data, control proceeds to step S14 where various kinds of learning data read out from the EEPROM 32 of the old control unit 3 are stored into the memory 102.

Then in step S15, a display prompting the connection of the new control unit 3 appears, and in step S16 it is confirmed if the new control unit 3 has actually been connected.

When the new control unit 3 has been connected, control proceeds to step S17 where the learning data that had been stored in the old control unit 3, are written to the EEPROM 32 of the new control unit 3 as they are.

Moreover, when in step S4 it is judged that the control unit 3 is not to be exchanged, control proceeds to step S18 where it is judged if there is to be an exchange of vehicle parts correlating to the learning data.

In the case where there is to be no exchange of the control unit 3 and of vehicle parts correlating to the learning data, the processing is completed at this point. However, in the case where there is to be an exchange of vehicle parts correlating to the learning data, control proceeds to step S19 and a display prompting the connection of the control unit 3 in use at the time appears, and in step S20 it is confirmed if the control unit 3 is actually connected.

When the control unit 3 has been connected, control proceeds to step S21 where the initial values of the learning data correlating to the vehicle parts to be exchanged are read out from the memory 103.

Then, in step S22 the learning data of the EEPROM 32 of the control unit 3 are rewritten to the initial values of the read out learning data.

Incidentally, in the case where there is no exchange of vehicle parts correlating to the learning data and it is only the control unit 3 that is to be exchanged, the learning data that have been stored in the EEPROM 32 of the old control unit 3 can be written to the EEPROM 32 of the new control unit 3 without any change of the learning data. Hence as shown in FIG. 4, the construction can be such that the transfer of the learning data is performed without using a dedicated tester (or a personal computer) 101.

Figure 4:
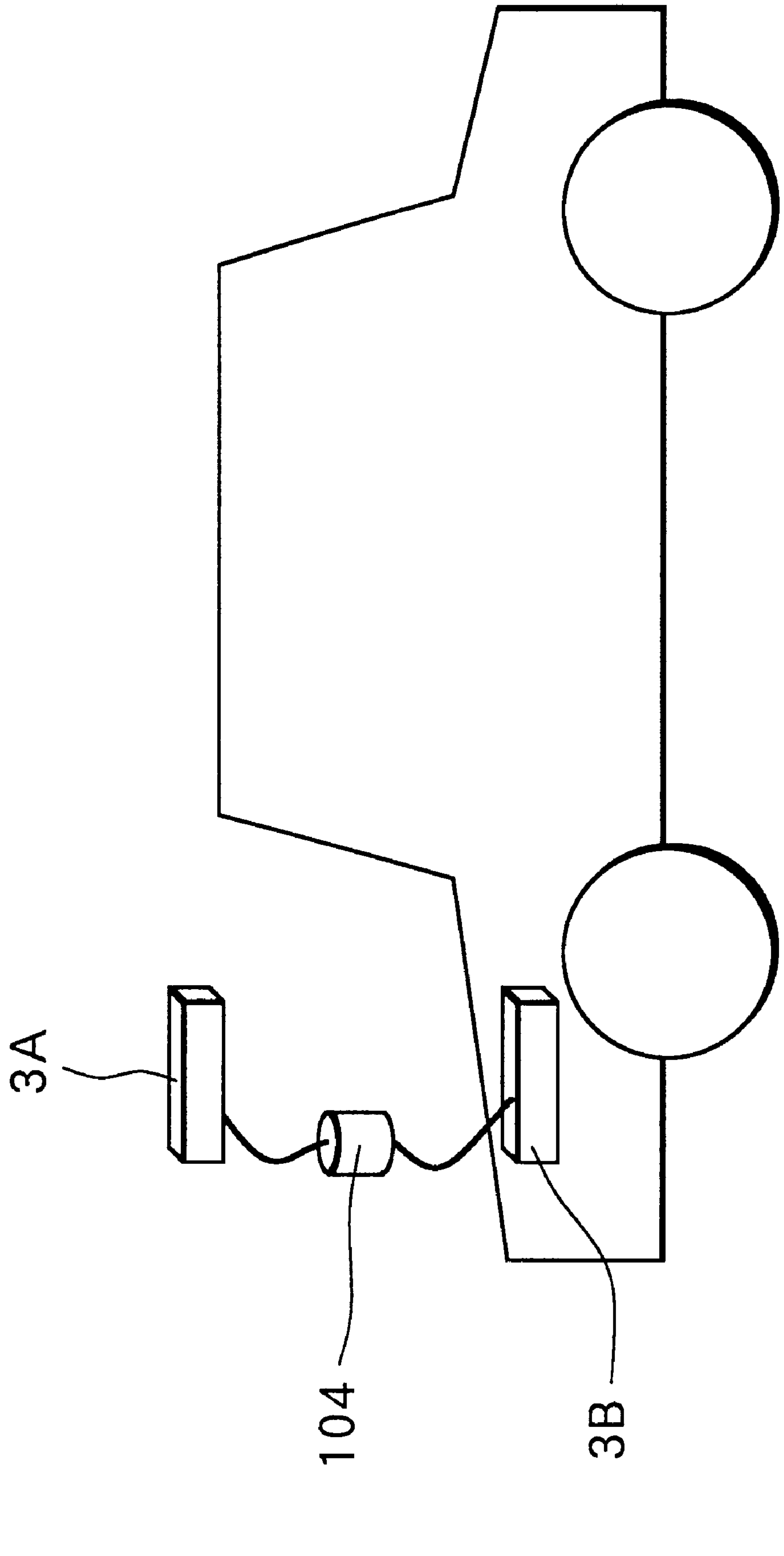
FIG. 4 is a system diagram showing another embodiment of the learning data rewriting system.

In FIG. 4 a new control unit 3A is communicably connected via the interface device 104, to the old control unit 3B mounted in a vehicle.

Here, when an operating part of the vehicle (accelerator pedal, brake pedal, ignition switch, etc.) is operated in an operation mode that does not occur under normal operation, the old control unit 3B mounted in the vehicle recognizes the operation as a trigger signal for the transfer of the learning data, and sends the learning data that have been stored in the EEPROM 32 as is to the new control unit 3A, so that the learning data are written into the EEPROM 32 of the new control unit 3A.

For the operation mode, for example an operation such as switching the ignition switch on and off a predetermined number of times with the brake pedal and the accelerator pedal simultaneously pressed, is pre-set.

What is claimed is:

1. A method of rewriting data of a control unit for a vehicle which stores learning data for vehicle control in a control memory which is electrically erasable and programmable, comprising the steps of:

inputting information of parts that have been exchanged among parts of sensors outputting detection signals to said control unit for the vehicle and among parts controlled by said control unit for the vehicle;

judging learning data which correlate to said parts exchanged among learning data for vehicle control stored in said control memory;

reading an initial value of learning data correlating to said parts exchanged out of initial values pre-stored for each of said learning data; and rewriting to said initial value, said learning data which correlate to said parts exchanged among the learning data for vehicle control stored in said control memory.

2. A method of rewriting data of a control unit for a vehicle according to claim 1, wherein said learning data for vehicle control includes air-fuel ratio learning data for making an air-fuel ratio of a combustion mixture of an engine correspond to a target air-fuel ratio.

3. A method of rewriting data of a control unit for a vehicle according to claim 1, wherein said learning data for vehicle control includes idle rotation learning data for making an engine rotation speed at the time of idling of an engine correspond to a target rotation speed.

4. A method of rewriting data of a control unit for a vehicle according to claim 1, comprising the steps of:

judging whether or not said control unit for the vehicle is to be exchanged;

transferring to a control memory of a new control unit for the vehicle, learning data except for those which correlate to parts to be exchanged from among learning data for vehicle control stored in a control memory of an old control unit for the vehicle, when said old control unit for the vehicle is exchanged, and then writing the transferred learning data in the control memory of the new control unit; and transferring to the control memory of the new control unit for the vehicle, an initial value of the learning data which correlate to the parts to be exchanged, and then writing the transferred initial value in the control memory of the new control unit.

5. A method of rewriting data of a control unit for a vehicle which stores learning data for vehicle control in a control memory which is electrically erasable and programmable, wherein said vehicle control unit mounted on a vehicle judges whether or not operating parts of the vehicle are operated in pre-set patterns, comprising the steps of:

when judging that the operating parts of the vehicle are operated in said pre-set patterns, recognizing said operation as a trigger signal for transferring said learning data for vehicle control; and when recognizing the operation as said trigger signal, transferring said learning data for vehicle control to a new control unit for the vehicle to be exchanged which is communicably connected to the vehicle control unit mounted on the vehicle, and then writing said learning data in the new control unit.

6. A method of rewriting data of a control unit for a vehicle according to claim 5, wherein said trigger signal is applied to said control unit mounted on the vehicle control unit, depending on an operating condition of an operating part which a vehicle driver operates.

7. A method of rewriting data of a control unit for a vehicle according to claim 6, wherein said operating part includes at least one of an accelerator pedal, a brake pedal, and an ignition switch.

8. A method of rewriting data of a control unit for a vehicle according to claim 7, wherein, when the ignition switch is switched on and off for a pre-set number of times with the brake pedal and the accelerator pedal simultaneously pressed, said switching operation is recognized as a trigger signal for transferring said learning data for vehicle control.

9. An apparatus for rewriting data of a control unit for a vehicle which stores learning data for vehicle control in a control memory which is electrically erasable and programmable, said apparatus comprising:

input means for inputting information of parts that have been exchanged among parts of sensors outputting detection signals to said control unit for the vehicle and among parts controlled by said control unit for the vehicle;

judging means for judging learning data which correlate to said parts exchanged among learning data for vehicle control stored in said control memory;

reading means for reading an initial value of learning data correlating to said parts exchanged out of initial values pre-stored for each of said learning data; and rewriting means for rewriting to said initial values, said learning data which correlate to said parts exchanged among the learning data for vehicle control stored in said control memory.

10. An apparatus for rewriting data of a control unit for a vehicle according to claim 9, wherein said learning data for vehicle control includes air-fuel ratio learning data for making an air-fuel ratio of a combustion mixture of an engine correspond to a target air-fuel ratio.

11. An apparatus for rewriting data of a control unit for a vehicle according to claim 9, wherein said learning data for vehicle control includes idle rotation learning data for making an engine rotation speed at the time of idling correspond to a target rotation speed.

12. An apparatus for rewriting data of a control unit for a vehicle according to claim 9, said apparatus comprising:

unit exchange judging means for judging whether or not said control unit for the vehicle is to be exchanged;

first writing means for transferring to a control memory of a new control unit for the vehicle, learning data except for those which correlate to parts to be exchanged from among learning data for vehicle control stored in a control memory of an old control unit for the vehicle, when said old control unit for the vehicle is exchanged, and then writing the transferred learning data in the control memory of the new control unit; and second writing means for transferring to the control memory of the new control unit for the vehicle, an initial value of the learning data which correlate to the vehicle parts to be exchanged, and then writing the transferred initial value in the control memory of the new control unit.

* * * * *